United States Patent [19]

Salemme

[11] 3,994,661
[45] Nov. 30, 1976

[54] ARTIFICIAL FIRE LOG EXPRESSION DIE AND FORMER

[75] Inventor: Fred J. Salemme, Stockton, Calif.

[73] Assignee: California Cedar Products Company, Stockton, Calif.

[22] Filed: July 18, 1975

[21] Appl. No.: 597,304

[52] U.S. Cl. .............................. 425/461; 425/190; 425/380
[51] Int. Cl.² .......................................... B29F 3/04
[58] Field of Search ........... 425/188, 190, 191, 192, 425/376, 381.2, 461, 462, 464, 380; 264/176, 177; 72/262

[56] References Cited
UNITED STATES PATENTS

| | | | |
|---|---|---|---|
| 1,809,837 | 6/1931 | Ewart | 425/380 |
| 3,421,220 | 1/1969 | Staga | 425/190 |
| 3,618,356 | 11/1971 | Sagmuller | 72/262 |
| 3,924,990 | 12/1975 | Schrenk | 425/462 |

FOREIGN PATENTS OR APPLICATIONS

| | | | |
|---|---|---|---|
| 1,281,680 | 3/1969 | Germany | 425/322 |
| 191,133 | 1/1923 | United Kingdom | 107/9.5 |

*Primary Examiner*—Robert L. Spicer, Jr.

[57] ABSTRACT

An extrusion die which is used to impart the desired shape to a material consisting of a mixture of wood, sawdust and wax, such that the material is suitable for use as an artificial fire log. The extrusion die, which forms one part of an extrusion apparatus, has its exit orifice located away from the center of the extrusion die, and has an integrally formed gradually sloping helical channel which feed the material to be extruded through the exit orifice.

10 Claims, 7 Drawing Figures

ARTIFICIAL FIRE LOG EXPRESSION DIE AND FORMER

BACKGROUND OF THE INVENTION

1. Field of the Invention

This invention relates to the field of extrusion dies used to shape material as it exits an extrusion apparatus.

2. Description of the Prior Art

An extrusion apparatus includes an auger mounted longitudinally within a hollow cylindrical chamber into which is fed the material which is to be extruded. The outside diameter of the auger is only slightly less than the inside diameter of the cylindrical chamber; therefore, as the auger is rotated by an external power source, the blade of the auger forces the material toward that end of the cylinder which includes an extrusion die. The material is thus forced out of the exit orifice of the extrusion die and takes on a cross-section identical to that of the exit orifice.

In the prior art extrusion machines the exit orifice of the extrusion die is located at the center of the extrusion die, that is, the centerline of the orifice is co-linear with the longitudinal centerline of the auger and cylindrical chamber. When the material used in the formation of artificial firelogs is extruded through an orifice so located, it has been found by the inventor that the center core of the firelog takes on a non-uniform density and contains voids. These defects resulted in a structurally weak log, an uneven burn rate, and a burn time which could not be accurately predicted. The object of this invention is therefore to provide an extrusion die assembly which can be used with material suitable for forming artificial firelogs, which will result in a log of uniform density throughout its cross-section thereby assuring a structurally sound log of even burn rate and uniform and predictable burn time.

BRIEF SUMMARY OF THE INVENTION

The extrusion die of the present invention is preferably made of bronze and roughly shaped like a disk. It is circular in shape having a diameter of approximately 14½ inches with a front surface and a rear surface. In the present invention these surfaces are referred to respectively as the exterior or second surface and the interior surface. The maximum thickness of this disk is presently about 3¼ inches. The interior surface of the extrusion die is so called because this or first surface of the die is presented to the interior of the extrusion apparatus when the die is properly affixed thereto. The opposite surface of the die is therefore referred to as the exterior surface.

A gradually deepening helical channel, about 3¾ inches wide and integrally formed out of the interior surface of the extrusion die, feeds the material to be extruded up to an exit orifice. Viewed from the exterior surface of the extrusion die, the shape of the exit orifice is defined by two straight parallel lines, about 4⅛ inches apart, and two circular arcs with a radius of about 3 inches. The centers of the arcs lie on a reference line drawn midway between the two parallel straight lines. The maximum distance between the two arcs is about 4 inches. This results in a shape suggestive of an ellipse having its ends flattened so as to be generally rectangular in appearance. This orifice is located away from the center of the die, that is, its longitudinal axis of the parallel to but not co-linear with the longitudinal axis of the extrusion die. In the presently preferred embodiment of the invention the centerline of the orifice is 3½ inches from the centerline of the die.

The exit orifice includes three walls and one open side. Two of the walls of the orifice are slightly sloped so that the efffective exit area of the orifice is less than the effective entrance area. The slope is relatively small, about 3° for each surface (plus or minus 2°), and causes the extruded material to be slightly compressed as it flows from the orifice entrance to its exit on the exterior side of the extrusion die. As the extruded material exits the orifice, it passes immediately into a appendage, which consists of two U shaped channels bolted together so as to form a tubular passage for the material. One end of the appendage is adapted to be bolted onto the exterior surface of the extrusion die over the exit orifice. The purpose of the appendage is to provide support for the extruded material for a time sufficient to allow the material to cool and become rigid enough that it does not crumble when it exits the appendage. If the appendage is too short, the material will be so hot upon exiting the appendage that it will not have sufficient rigidity to maintain its own shape. If the appendage is too long, the force of extrusion will not be sufficient to push the material through the appendage and this will cause the extruding apparatus to jam as material is prevented from passing through the orifice. In the preferred embodiment, the length of the appendage is approximately 11½ inches.

The cross sectional area of the extruded material can be changed as desired by simply detaching one appendage and bolting another, of the desired cross-sectional area and shape, into place over the orifice.

BRIEF DESCRIPTION OF THE FIGURES

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
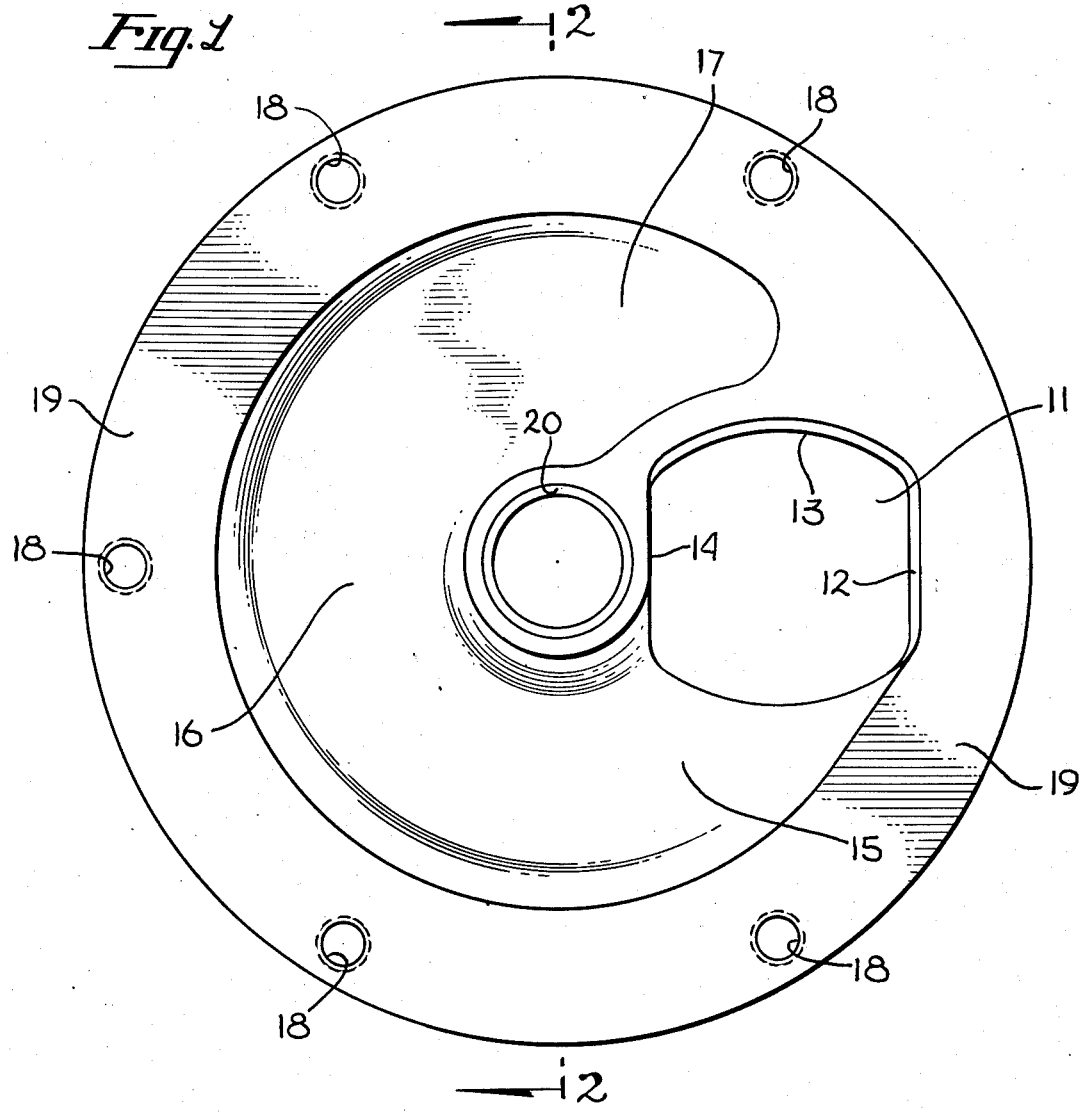
FIG. 1 is a view of the interior surface of the extrusion die in accordance with the present invention showing the surface which is presented to the interior of the extrusion apparatus when the extrusion die is properly fastened onto the extrusion apparatus.

The invention illustrated in FIGS. 1 through 5 is a mechancial apparatus used to impart the desired shape, density, and burning characteristics to an extruded material consisting of wax and wood sawdust such that the material is suitable for use as a fire log.

FIGS. 1 through 4 illustrate the extrusion die.

The exit orifice 11 of the extrusion die is located away from the center of the die. The orifice is located so as to insure that the core of the extruded material is very nearly of uniform density having a minimum number of voids. By placing the orifice away from the center of the die, the material is more uniformly in motion as it enters the orifice. If the orifice were located at the center of the die, the rotating blades of the auger would cause the material to spiral into the orifice, thus forming a vortex. This would cause the center or core of the extruded material to experience a turbulent flow resulting in non-uniform density at the core of the extruded material. In contrast, by placing the orifice away from the center of the die and providing a helical channel 15 to direct the flow of material, all the material enters the orifice moving in nearly the same direction; thus no vortex is formed. The flow of material is more nearly laminar, and consequently the density is uniform across the cross section of the extruded material, including the core. It as been found that the optimum laminar flow into the orifice 11 occurs when the orifice wall 14, which is closest to the center of the die, is further from the center of the die than the shaft or nose 31 of the auger blades 32 or 33, and the orifice wall 12, which is furthest from the center of the die, is further from the center of the die than the path traced by the outer edge of the auger blades.

Figure 4:
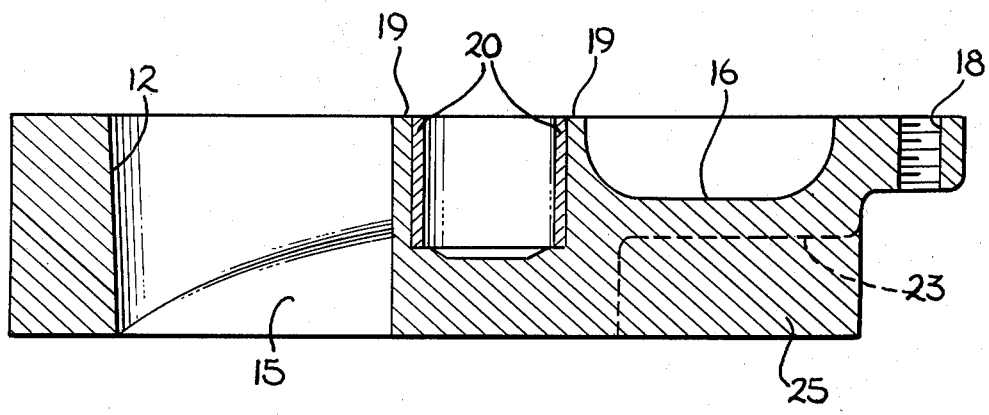
FIG. 4 is a cross sectional view taken along line 4—4 in FIG. 3.

The orifice 11 has three walls, designated as 12, 13 and 14. The fourth side of the orifice is not a wall but rather is open to allow material to enter the orifice in as near to a laminar flow condition as possible. Two of the walls, 12 and 13, have a slight slope to them. These walls, which slope at an angle of about 3°, cause the effective exit area of the orifice to be smaller than the effective entrance area, resulting in a compaction of the material as it passes through the orifice. This 3° slope is best illustrated in FIG. 4 which shows the slope of wall 12. Wall 14 has no slope to it.

Figure 6:
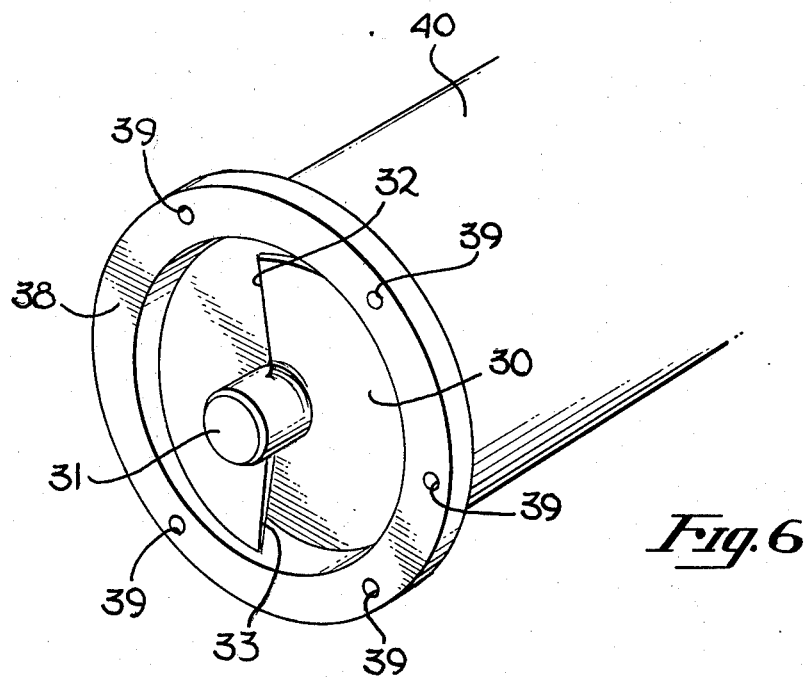
FIG. 6 shows an internal view of the extrusion apparatus with the extrusion die removed.

Material enters the exit orifice 11 after traveling down a gradually deepening helical channel the deepest section of which is indicated as 15. The most shallow portion of this channel is indicated as 17. The channel is at its median depth at 16. The rotation of the auger 30, shown in FIG. 6, is in the direction of the deepening channel, that is 17 to 16 to 15. It is the rotation of the auger that pushes the material down the channel toward the orifice 11.

Around the periphery of the die are a number of holes 18 through which bolts are passed and secured to the end of the cylindrical extruder chamber 40 at points 39 shown in FIG. 6. The surface 19 of the extrusion die is smooth so as to form a tight fit with surface 38 of the extruder chamber.

Located at the center of the extrusion die is a depression into which is fitted a soft metal bushing 20, e.g. a brass bushing. When the die is mounted on the cylindrical chamber 40, the nose 31 of the auger is seated in the bushing 20, thus keeping the auger 30 properly aligned as it is rotated by an appropriate external power source.

The construction of the above described extrusion die can be readily modified so as to embody two exit orifices. Each orifice would be similar to that described above and would be located approximately 180° from the other orifice. Each such orifice would have its own helical channel to feed material into the orifice, and each orifice would have a appendage to shape the material after it exits the orifice. Further modifications can be made to accommodate more than two such exit orifices.

Figure 2:
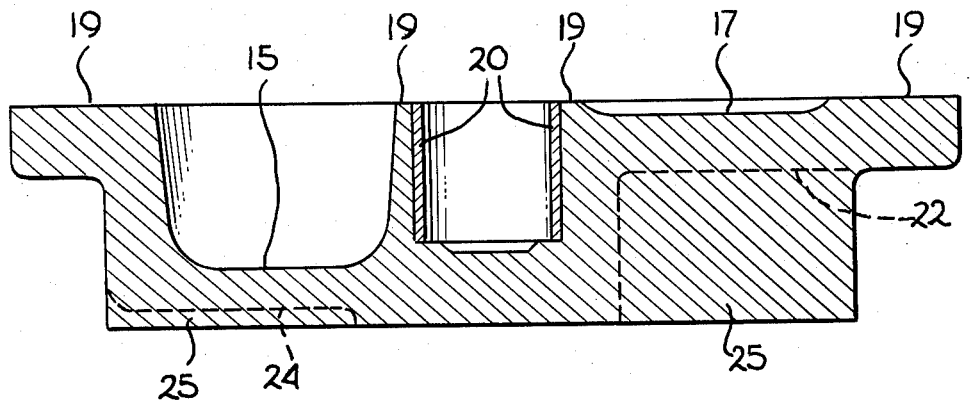
FIG. 2 is a cross sectional view taken along line 2—2 in FIG. 1.

FIG. 2 illustrates the cross section 2—2 of FIG. 1, and shows the relative depth of the helical channel at points 17 and 15.

Figure 3:
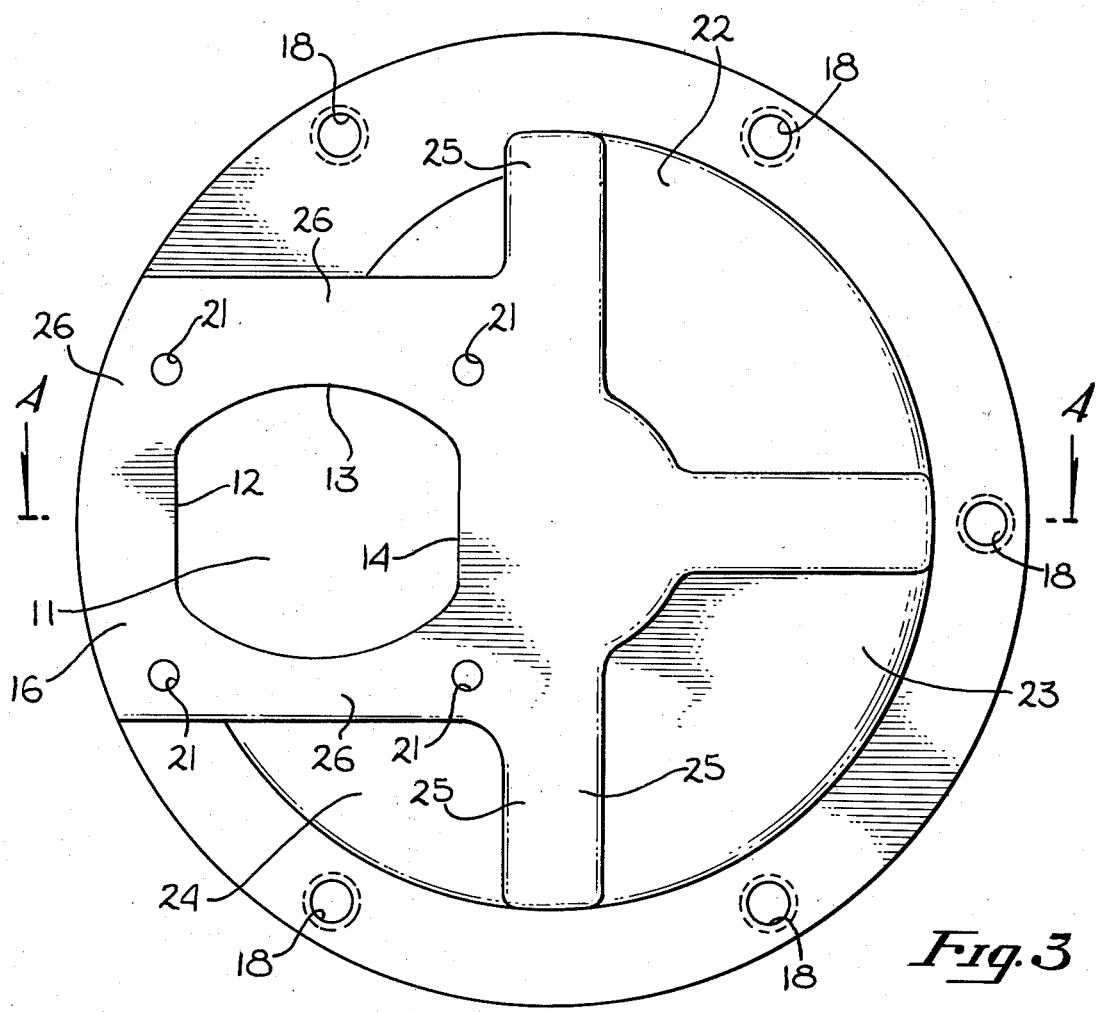
FIG. 3 is a plane view of the exterior surface of the extrusion die.

FIG. 3 illustrates the exterior surface of the extrusion die, and shows the reinforcing ribs 25 which enable the extrusion die to withstand the extrusion forces without any structural distortion in the die. The threaded holes 21 which appear in the surface 26 are the holes used to bolt the appendage halves to the extrusion die. Other features are labeled so that FIG. 3 can be compared with FIG. 1. It should be noted that surface 22 is directly opposite surface 17 on the other side of the die. A similar relationship exists between surface 16 and surface 23 and also between surface 15 and 24.

FIG. 4 is the sectional view 4—4 of FIG. 3. This Figure is used to show the 3° slope of surface 12 and the absence of any slope to surface 14. Also illustrated is the relationship between surface 16 and 23 as discussed above. This figure also illustrates the relative depth of the channel at reference point 16.

Figure 5:
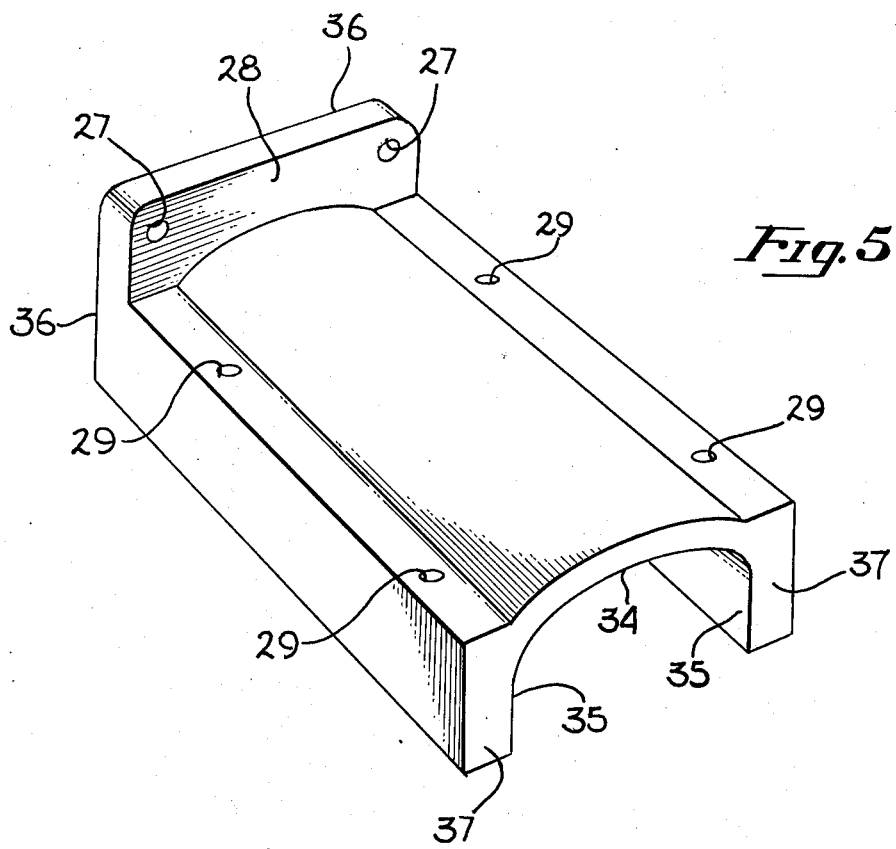
FIG. 5 is a perspective view of one of two substantially similar pieces which when bolted together constitute the appendage, which is attached to the exit orifice of the die of FIGS. 1–4.

FIG. 5 shows one of two similarly shaped appendage halves. Each half has holes 27 located in a flange 28 which are used in bolting the end 36 of the appendage to the surface 26 of the extrusion die. The holes 29 allow the two halves of the appendage to be bolted together and thus form the tubular section called the appendage. The interior surfaces of the appendage are designated 34 for the circular arc portions and 35 for the flat portions. The end which is fastened to the extrusion die is labeled 36, the other end is designated 37.

The extrusion device to which the present invention is attached at points 39 is illustrated in FIG. 6. This figures shows the cylindrical chamber 40, the auger 30, the auger blades 32 and 33 and the auger nose 31. The operation of this extrusion device is well known and is not a part of the present invention other than for the purpose of illustrating the means of feeding extrusion material down the helical channel through the orifice 11.

Figure 7:
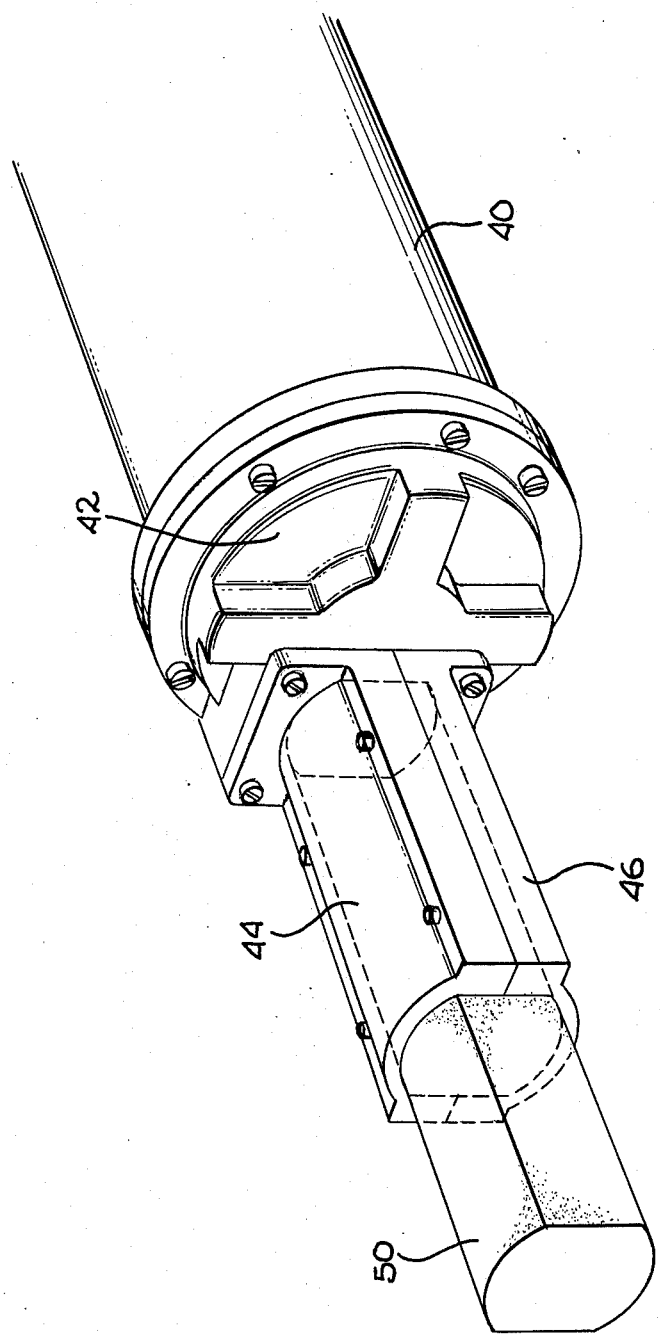
FIG. 7 shows the assembled former, extrusion die, and extrusion apparatus with a log exiting the appendage.

FIG. 7 shows the extrusion die and appendage as they appear when mounted upon an extrusion device. The extrusion die 42 is mounted on one end of the extrusion cylinder 40. The appendage halves, 44 and 46, are fastened together and mounted over the exit orifice 11 of the extrusion die. A section of the extruded material 50 is shown as it exits the appendage halves.

The materials to be extruded are loaded into the extrusion cylinder 40 at the end opposite the expression die 42. The rotation of the helical auger blades further mixes the material and also moves the material toward the extrusion die. As the material reaches the extrusion die its motion is generally helical in nature. The helical channel formed in the interior surface of the extrusion die encourages this helical flow and guides a portion of the material along the channel to the orifice 11. Material may also enter the orifice without traveling down the channel, but when this material reaches the vicinity of the orifice its path is influenced extensively by the flow of material from the helical channel. This confluence of material flows through the orifice and is compacted thereby and then enters the appendage. The driving force of the rotating auger blades pushes the material through the appendage toward the exit thus producing an artificial fire log 50. Typically the fire log is extruded at the rate of from zero to approximately 350 inches per minute, depending on the speed of the rotating auger blades.

Various additional changes and modifications in the above described apparatus and the method of operation thereof will be readily apparent to one skilled in the art and such changes and modifications are deemed to be within the spirit and scope of the present invention as set forth in the following appended claims.

What is claimed is:

1. An extrusion die being generally in the shape of a circular disk and having a first surface and side and a second surface and side and an appendage, said extrusion die being suitably mountable upon an extrusion apparatus which includes a cylindrical chamber and an auger;

said first surface having the following features;
 a. an orifice, disposed a substantial distance away from the center of the extrusion die with its centerline parallel to the centerline of the die, which allows material to pass through the extrusion die;
 b. a gradually deepening helical channel, integrally formed out of the first surface of the die, which directs the flow of material around the first surface toward the entrance of the orifice located at the end of the channel;
 c. a generally cylindrical depression at the center of said extrusion die;
 d. a tubular metal bushing securely fitted within said cylindrical depression;

said second surface having the following features:
 e. a plurality of reinforcing ribs extending outward from a common source at the center of the extrusion die;
 f. the exit of the orifice;

said appendage being adapted to be mounted on said second surface of the extrusion die over said orifice.

2. An extrusion die according to claim 1 wherein the orifice is generally rectangular in cross section having a first, second and third wall and an entrance side, the first and second walls of said orifice being adjacent to one another and having a slope between 1° and 5° such that the effective exit area of the orifice is less than the effective entrance area of the orifice; the third wall, positioned between the second wall and what would be the position of a fourth wall, if there was one, having no such slope to it; the fourth side of the orifice being open upon said helical channel thereby forming the entrance to the orifice.

3. An extrusion die according to claim 1 upon which is mounted an appendage comprising two U-shaped channels joined together so as to form a tubular passegeway extending from the exit side of the orifice to the opposite end of the appendage, said tubular passegeway having the same cross-sectional shape as that desired for the extruded product.

4. An extrusion die being generally in the shape of a circular disk and having a first surface and a second surface and an appendage, said extrusion die being adapted for mounting upon an extrusion apparatus which includes a cylindrical chamber and auger; said first surface having the following features:
 a. a generally rectangularly shaped orifice having a first, second and third wall and an entrance side; the first and second wall of said orifice being adjacent to one another and having a slope of between 1 and 5 degrees such that the effective exit area of the orifice is less than the effective entrance area of the orifice; the third wall, positioned between the second wall and what would be the position of the fourth wall if there was one, having no such slope to it; the fourth side of the orifice being open so as to allow material to enter the orifice; said orifice being so located that, when the extrusion die is mounted upon the extrusion apparatus, the first wall of the orifice which is further from the center of the extrusion die is further from the center of the extrusion die than the path traced by the outer edge of the blades of said auger; and the third wall of the orifice, which is nearer to the center of the die, is further from the center of the die than the path traced by the inner edge of said auger blade; the difference between the effective exit area and effective entrance area of said orifice causing material passing through said orifice to be compacted;
 b. a gradually deepening helical channel integrally formed out of the first surface of the die which directs the flow of material along the channel toward the entrance of the orifice;
 c. a generally cylindrical depression at the center of said extrusion die;
 d. a tubular metal bushing being securely fitted within said depression;

said appendage comprising two U-shaped channels joined together and mounted over the exit of the orifice so as to form a tubular passegeway extending from the exit side of the orifice to the opposite end of the appendage, said tubular passage having the same cross-sectional shape as that desired for the extruded product.

5. An extrusion die according to claim 1 having two such orifices located approximately 180° apart from one another on said die and likewise having two such helical channels and two such appendages, one channel and one appendage for each orifice.

6. An extrusion die according to claim 2 having two such orifices located approximately 180° apart from one another on such die and likewise having two such helical channels and two such appendages, one helical channel and one appendage for each orifice.

7. An extrusion die according to claim 3 having two such orifices located approximately 180° apart from one another on said die and likewise having two such helical channels and two such appendages, one helical channel and one appendage for each orifice.

8. An extrusion die according to claim 4 having two such orifices located approximately 180° apart from one another on such die and likewise having two such helical channels and two such appendages, one helical channel and one appendage for each orifice.

9. An extrusion die according to claim 1 having a plurality of such orifices approximately equally spaced upon such die, each orifice being supplied with a separate helical channel and a separate appendage.

10. An extrusion die according to claim 4 having a plurality of such orifices approximately equally spaced upon such die, each orifice being supplied with a separate helical channel and a separate appendage.

* * * * *